(No Model.)

F. B. RAE.
MOTOR TRUCK FOR ELECTRICALLY PROPELLED VEHICLES.

No. 437,661. Patented Sept. 30, 1890.

WITNESSES.
L. W. Bradford
F. E. Fisk

INVENTOR.
Frank B. Rae

United States Patent Office.

FRANK B. RAE, OF DETROIT, MICHIGAN, ASSIGNOR TO THE DETROIT ELECTRICAL WORKS, OF SAME PLACE.

MOTOR-TRUCK FOR ELECTRICALLY-PROPELLED VEHICLES.

SPECIFICATION forming part of Letters Patent No. 437,661, dated September 30, 1890.

Application filed June 13, 1889. Serial No. 314,140. (No model.)

*To all whom it may concern:*

Be it known that I, FRANK B. RAE, a citizen of the United States, residing at Detroit, in the county of Wayne and State of Michigan, have invented certain new and useful Improvements in Motor-Trucks for Electrically-Propelled Vehicles; and I do hereby declare that the following is a full, clear, and exact description of the invention, which will enable others skilled in the art to which it appertains to make and use the same.

My invention relates to motor-trucks for electrically-propelled vehicles, and has for its object to provide improved means for supporting the electric motor in position upon the truck to furnish a positive, direct, and simple connection between the motor and the driving-wheels of the vehicle, so that the mechanical energy of the motor is uniformly transmitted to the wheels by direct positive connections; and my invention consists in a motor-truck constructed substantially as hereinafter set forth.

Figure 1:
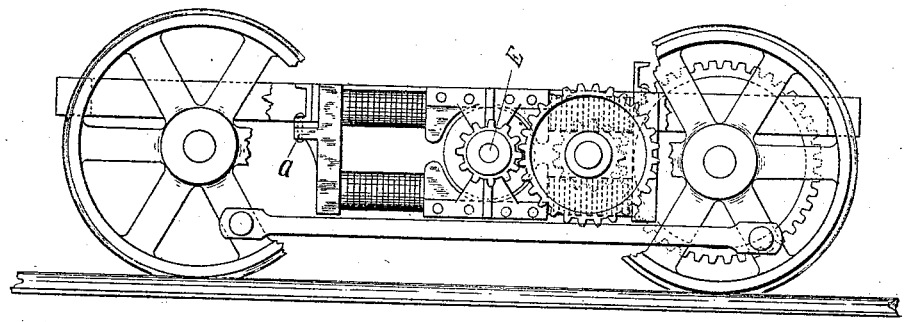
Figure 2:
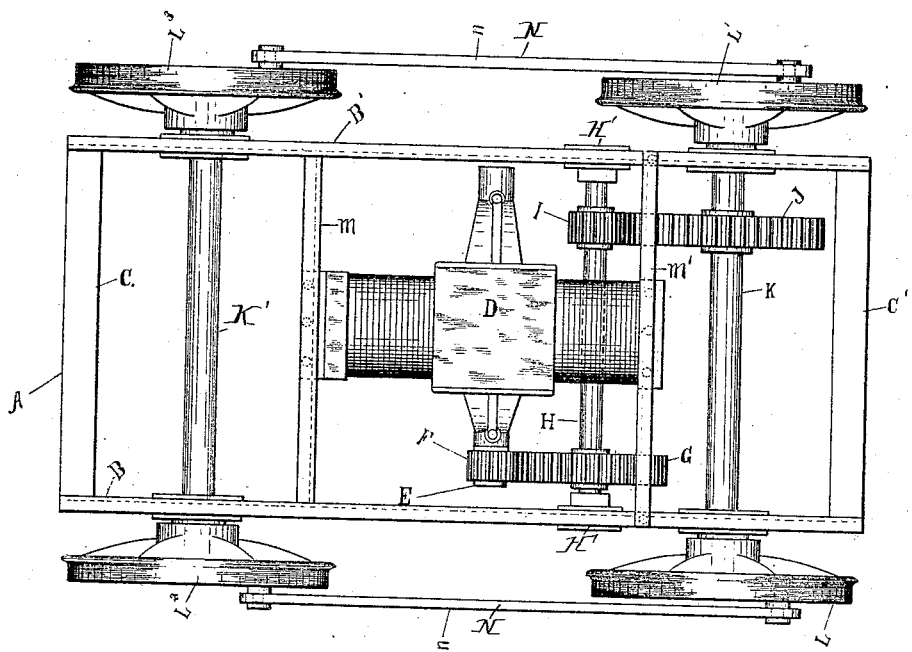

In the accompanying drawings, Figure 1 is a side view of a motor-truck embodying my invention, parts being broken away to better illustrate certain connections. Fig. 2 is a top plan view of the truck complete.

One of the essential objects of my invention is to provide simple and effective means whereby the energy of the motor can be transmitted directly and uniformly to the wheels of the truck, and, incidentally thereto, to provide means whereby the motor may be rigidly and fixedly mounted with relation to the wheels, so that under all conditions its energy may be properly and evenly transmitted to the wheels of the truck.

In accomplishing these ends and others, I provide a rigid truck-frame A, consisting of the side bars B B', which are rigidly connected to the car-axles K K' at or near their extremities, and the end beams C C', which unite with the side bars and form a substantial rigid frame, maintaining the axles in parallelism. An electric motor D is rigidly mounted in connection with the frame, and to do this I support the motor at each end of its field-magnets on the two transverse bars M M'. These transverse bars extend between the side bars B B', and are secured thereto in any suitable manner, and I have shown the bar M as extending between the bars B B' and on the plane therewith, while the bar M', in the present instance, is secured upon the top of the bars B B', in order to give more room for the connecting-rod. The motor is shown as connected to these bars by bolts, which may pass through lugs, as $a$, on the end of the field-magnet, or the field-magnet frame may be bolted directly to the cross-bars. In this way the motor can be rigidly and securely mounted in the rigid frame which is likewise rigidly connected to the axles, and the gearing being once adjusted to run freely and smoothly will remain so and not be liable to derangement from the necessary shocks and jars incidental to the use of the truck.

The armature-shaft E is provided with a pinion F, meshing with a gear-wheel G, which is mounted upon the counter-shaft H, supported in hangers H', secured to the side bars B B'; also mounted on this counter-shaft is a pinion I, which meshes with a large gear J, secured on the axle K. This axle is provided at its ends with the wheels L L', and the axle K' is likewise provided with the wheels $L^2$ $L^3$, and these wheels are connected in pairs by the connecting-rods N, mounted on studs or otherwise secured to the outside of the wheels and causing them to rotate in unison, transmitting the power from the motor through the axle of the wheels L L' to the wheels $L^2$ $L^3$.

From this construction it will be seen that the whole truck constitutes a practically rigid structure, the gears and their supporting-shafts and the axles being maintained in their parallelism under all conditions, thereby preventing friction and wear and allowing the gears to be accurately and nicely adjusted and to run without danger of derangement, and the energy of the motor is transmitted practically uniformly to all four of the wheels so that the greatest amount of traction is obtained.

What I claim is—

1. A motor truck consisting of a rectangular frame rigidly mounted on the axles, cross-bars connected to the frame supporting the motor, a counter-shaft also connected to the frame, and gears connecting the armature and axle through the medium of the counter-shaft and operating the wheels upon the axles, substantially as described.

2. A motor-truck consisting of a rectangular frame rigidly supported upon the axles, cross-pieces mounted on the frame to which the field-magnets of the motor are connected, a counter-shaft also connected to the frame, gearing connecting the armature and one of the axles, and connecting-rods connecting the wheels together, substantially as described.

In testimony whereof I have hereunto set my hand.

FRANK B. RAE.

Witnesses:
A. D. AYRES,
JOHN MACDONALD.